United States Patent [19]

Naylor

[11] 3,999,966

[45] Dec. 28, 1976

[54] DEODORIZER FOR TRIGLYCERIDE OILS

[75] Inventor: Leonard Naylor, Hull, England

[73] Assignee: Simon-Rosedowns Limited, Hull, England

[22] Filed: Apr. 17, 1975

[21] Appl. No.: 569,002

[30] Foreign Application Priority Data

May 30, 1974 United Kingdom ............ 23955/74

[52] U.S. Cl. .................................. 55/195; 55/198; 210/180

[51] Int. Cl.² ........................................ B01D 19/00

[58] Field of Search .................... 210/71, 175, 180; 55/80, 228, 268, 269, 198, 195, 189

[56] References Cited

UNITED STATES PATENTS

| | | | |
|---|---|---|---|
| 2,136,029 | 11/1938 | Stewart | 55/195 |
| 3,003,640 | 10/1961 | Peauc | 210/71 X |
| 3,532,595 | 10/1970 | Arnesjo et al. | 55/80 |
| 3,547,268 | 12/1970 | Passalaqua | 210/71 |
| 3,607,617 | 9/1971 | Drew | 55/80 |
| 3,607,670 | 9/1971 | King | 55/198 |
| 3,650,403 | 3/1972 | Aldridge | 210/180 |
| 3,693,322 | 9/1972 | Lineberry et al. | 55/198 |

*Primary Examiner*—Theodore A. Granger
*Attorney, Agent, or Firm*—Norris & Bateman

[57] ABSTRACT

A deodorizer of the kind wherein consecutive batches of oil to be deodorized are progressed through a plurality of consecutive treatment vessels during which each batch is first heated, then subjected to the action of a stripping gas and finally cooled, all under a high degree of vacuum, each batch of oil having a period of residence in each such vessel, characterized in that means is provided whereby a batch of oil to be treated is partially heated by heat exchange with a fluid medium which is itself heated by heat exchange with a previously processed batch of oil for the purposes of cooling the latter.

10 Claims, 1 Drawing Figure

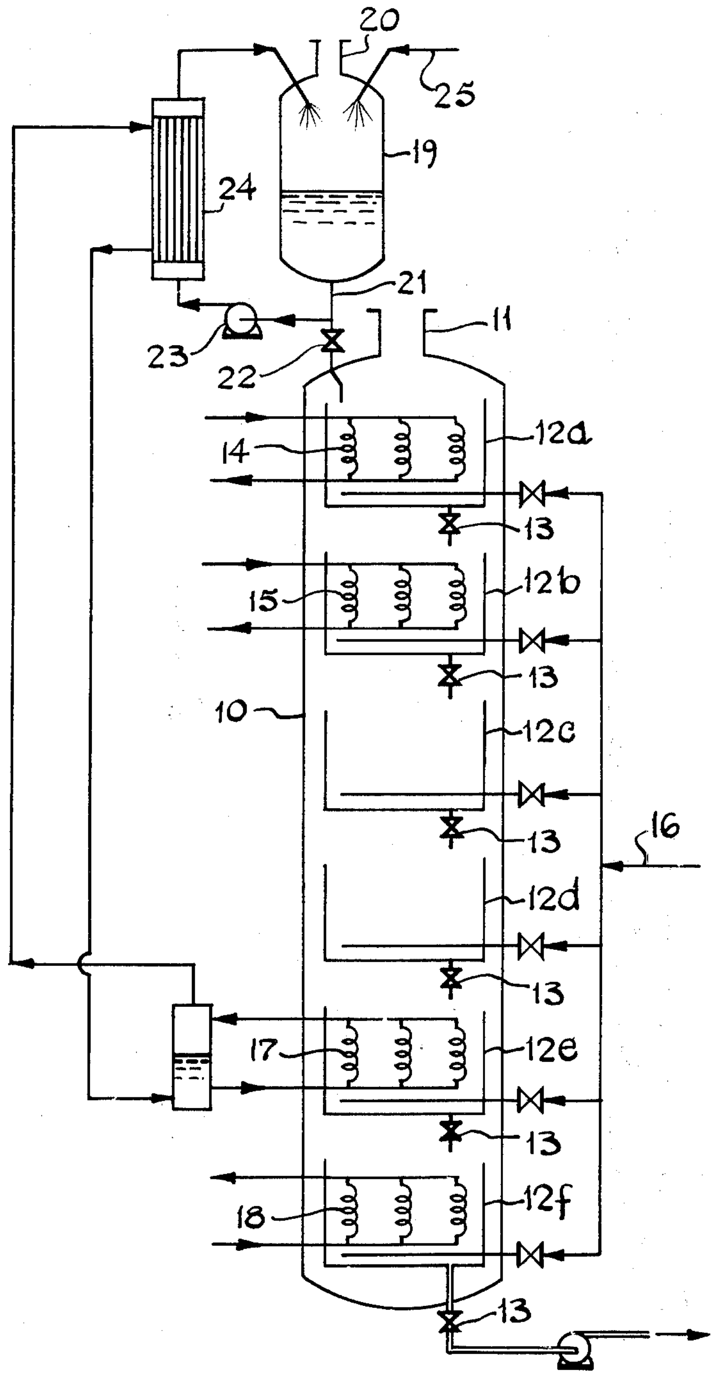
20
25
19
24
21
11
23
22
12a
14
13
12b
15
13
10
12c
13
16
12d
13
17
12e
13
18
12f
13

DEODORIZER FOR TRIGLYCERIDE OILS

This invention relates to a deodorizer for triglyceride oils particularly, though not exclusively, edible vegetable oils and of the kind (hereinafter termed of the kind referred to) wherein consecutive batches of oil to be deodorized are progressed through a plurality of consecutive treatment vessels during which each batch is first heated, then subjected to the action of a stripping gas and finally cooled, all under a high degree of vacuum, each batch of oil having a period of residence in each such vessel.

A well-known type of deodorizing apparatus of the kind referred to is comprised by a vertically extending vacuum tower containing a plurality of trays each having a so-called drop-valve in the base thereof, whereby oil can be passed down the tower from one tray to the next. It will be understood that the oil is processed on a batch basis, but that fresh batches can be introduced at the top of the tower at regular intervals.

With the increasing cost of thermal energy it is desirable that the heat obtained from the oil during the cooling stage of the treatment is not wasted.

The present invention is based upon an appreciation of the possibility of recovering part of this heat and using it to raise the temperature of the oil feed.

Thus, according to the present invention a deodorizer of the kind referred to is characterised in that means is provided whereby a batch of oil to be treated is partially heated by heat exchange with a fluid medium which is itself heated by heat exchange with a previously processed batch of oil for the purposes of cooling the latter.

The invention will be further apparent from the following description with reference to the single FIGURE of the accompanying drawing which shows, by way of example only, in diagrammatic form, one form of deodorizer of the kind referred to and embodying the invention.

Referring now to the drawing, it will be seen that the apparatus essentially comprises in known manner a vertically extending tower 10, whose interior is continuously exhausted through a duct 11 at its upper end so that a high degree of vacuum, typically of the order of 5 mm of mercury, is maintained within the tower. Disposed above one another within the tower 10 are a plurality of trays 12, each of which is capable of holding a batch of oil being processed. A remotely operable drop-valve 13 is located in the base of each tray 12 whereby each batch of oil may be passed downwardly through the tower 10 whilst having a predetermined period of residence in each tray 12.

In each operating cycle the drop-valves 13 are opened one at a time in turn, at equal intervals of time starting with the lowermost and working upwardly. After the uppermost valve 13 has been opened to empty the uppermost tray 12*a*, all the valves 13 are kept closed for a predetermined period before commencement of the next cycle.

A batch of oil to be treated is introduced into the tower 10 and fed to the uppermost tray 12*a* each time the tray 12*a* is emptied. The oil in the tray 12*a* is heated by heat exchange with steam from a boiler which passes through coils 14 located within the tray 12*a*. Oil in the adjacent tray 12*b* is heated further and to an elevated temperature of up to 270° C or thereabouts (not shown) by heat exchange with a suitable fluid which is heated by a high temperature heater (not shown) and passes through coils 15 located within the tray 12*b*. An example of a suitable fluid is a eutectic mixture of diphenyl and diphenyl oxide.

A small quantity of dry steam is sparged into the oil contained within the upper two tanks 12*a* and 12*b* from a line 16 for the purpose of agitating and circulating same to ensure good heat exchange.

The oil in the next two tanks down the tower 12*c* and 12*d* is subjected to the action of larger quantities of dry steam which is sparged thereinto from the line 16 for the purposes of stripping off the volatile impurities present in the oil. The oil in the next lower tank 12*e* is cooled by heat exchange with a fluid which passes through coils 17 located within the tray 12*e*.

Oil in the lowermost tray 12*f* is further cooled by heat exchange with water which is passed through coils 18 located within the tray 12*f*.

In accordance with the invention, a small tank 19 is provided for the purpose of storing each batch of oil prior to its passage to the uppermost tray 12*a* in the tower 10 through a line 21 containing a valve 22. Preferably the tank 19 is located above the top of the tower 10 so that the oil can be passed into the tower 10 under the influence of gravity. The interior of the tank 19 is exhausted through a duct 20 at its upper end for the purposes of de-aerating the oil whilst it is contained within the tank 19.

Whilst each batch of oil is held in the tank 19 it is pre-heated by circulation by means of a pump 23 through a heat exchanger 24 whose primary side is connected with the coils 17.

Oil returning to the tank 19 from the heat exchanger 24 is introduced by way of a spray nozzle, as is oil entering the tank 19 initially through a feed line 25, further to assist in de-aeration of the oil.

Preferably the fluid in the coils 17 and primary side of the heat exchanger 24 is such that it will circulate readily without mechanical assistance. Water is the preferred fluid.

A small quantity of dry steam is sparged into the contents of the two trays 12*e* and 12*f* from the line 16 for the purpose of circulating and agitating same to ensure good heat transfer.

A line 25 is provided for feed of oil to the tank 19 to enable a fresh batch of oil to be assembled each time the tank 19 is emptied.

It will be appreciated that it is not intended to limit the invention to the above example only, many variations, such as might readily occur to one skilled in the art, being possible without departing from the scope thereof.

Thus, for example, it is hoped that by using apparatus embodying the invention, the oil entering the tower 10 can be pre-heated sufficiently as to eliminate the need for heating the oil in the tray 12*a* by steam. This tray and associated heating means should, however, be provided as an auxiliary means for heating the oil on starting up, or when recovering from temporary interruptions of oil supply caused by switching the deodorizer to process a different type of oil.

Again, for example, the tank 19 need not be provided and the initial heating can take place in a tray at the top of the tower 10 located above the tray 12*a* or provided in place of the tray 12*a*.

What is claimed is:

1. An oil deodorizer comprising means defining an enclosure and means for evacuating the enclosure, a series of vessels in said enclosure, each, except the last in the series, having means for selectively discharging its contents to a next vessel in the series whereby consecutive batches of oil to be treated may be progressed through successive vessels, means for supplying batches of oil to be deodorized in succession to a vessel at the beginning of said series, means for heating the oil in said vessel at the beginning of said series, means at an intermediate vessel in the series into which said heated oil is discharged for subjecting the heated oil to the action of stripping gas, and heat exchange means at a vessel in the series receiving oil from said intermediate vessel for cooling said oil, characterized by means for applying heat derived from said cooling of said oil to heat said batches of oil so that preheated oil batches will be supplied to said vessel at the beginning of the series.

2. A deodorizer according to claim 1, wherein said means for supplying preheated oil comprises a fluid medium system having an oil cooling portion providing said heat exchange means at said last vessel in the series and an oil heating portion in heat exchange relation with said oil at said batch supplying means.

3. A deodorizer according to claim 2 wherein said fluid medium is water.

4. A deodorizer according to claim 2, wherein a tank is provided for storage of each batch of oil to be treated prior to its passage through the treatment vessels of the deodorizer, and said means for preheating the oil is operative on the batch of oil in said tank.

5. A deodorizer according to claim 4 including a pump for drawing oil from said tank and passing same through a heat exchanger in said fluid medium system before returning the oil to the tank, the primary side of said heat exchanger being connected with heat exchange means located in said vessel wherein the oil is cooled.

6. A deodorizer according to claim 5 wherein oil re-entering the tank from the heat exchanger is caused to be sprayed into the tank to assist in de-aerating the oil

7. A deodorizer according to claim 5 wherein means is provided whereby the interior of said tank is evacuated for the purposes of de-aerating the oil.

8. A deodorizer according to claim 7 wherein oil re-entering the tank from the heat exchanger is caused to be sprayed into the tank further to assist in de-aerating the oil.

9. An oil deodorizer comprising means defining an enclosure, means for evacuating the enclosure, a series of vessels mounted in vertically spaced relation within said enclosure, each of the uppermost vessels having valve means selectively operable for discharging its contents into the vessel below whereby consecutive batches of oil to be deodorized may be progressed through the successive vessels, means providing a store of oil to be deodorized periodically operable to supply a batch of oil to an upper vessel in said series, means at said upper vessel for heating the oil therein, means at an intermediate vessel disposed to receive heated oil discharged from an upper vessel for subjecting the heated oil to a stripping gas, heat exchange means at a lower vessel disposed to receive oil discharged from an intermediate vessel for cooling said oil, and means for applying heat from said heat exchange means to heat oil in said storing means so that batches of preheated oil may be delivered to said upper vessel.

10. The deodorizer defined in claim 9, wherein said heat exchanger is part of a fluid medium system that has a further heat exchanger at said oil storing means.

* * * * *